May 24, 1932. S. E. WOODWORTH 1,859,642
ROTARY VACUUM FILTER
Filed Sept. 16, 1931 3 Sheets-Sheet 1

INVENTOR.
Selim E. Woodworth
BY Townsend and Loftus
ATTORNEYS.

May 24, 1932.   S. E. WOODWORTH   1,859,642
ROTARY VACUUM FILTER
Filed Sept. 16, 1931   3 Sheets-Sheet 2

INVENTOR.
Selim E. Woodworth
BY Townsend and Loftus
ATTORNEYS.

May 24, 1932.  S. E. WOODWORTH  1,859,642
ROTARY VACUUM FILTER
Filed Sept. 16, 1931    3 Sheets-Sheet 3

INVENTOR.
Selim E. Woodworth
BY Townsend and Loftus
ATTORNEYS.

Patented May 24, 1932

1,859,642

UNITED STATES PATENT OFFICE

SELIM E. WOODWORTH, OF SAN FRANCISCO, CALIFORNIA, ASSIGNOR TO HAMILTON, BEAUCHAMP & WOODWORTH, OF SAN FRANCISCO, CALIFORNIA, A PARTNERSHIP COMPOSED OF E. M. HAMILTON, F. A. BEAUCHAMP, AND S. E. WOODWORTH

ROTARY VACUUM FILTER

Application filed September 16, 1931. Serial No. 563,009.

This invention relates to filters and especially to filters of the rotary type.

The type of filter illustrated in the present application consists of a revolving drum or shell, the lower portion of which is submerged in a tank containing pulp to be filtered. The shell is hollow and consists of an inner air and water-tight backing and an outer surface formed of a filtering medium. The space between the two surfaces is divided into cells or shallow compartments by division strips positioned parallel to the axis of the drum, and each cell or compartment contains a grid to insure drainage and at the same time afford a rigid smooth surface to support the filtering medium and the cake formed thereon.

Each cell or compartment forms virtually an independent filter unit although the filtering medium is attached as a continuous sheet over the whole surface of the drum. This is due to the fact that the drum is provided with a system of radially extending pipes which connect each cell with an automatic valve which controls the application of vacuum or pressure as the case may be. The automatic valve, in fact, controls the whole cycle of operation, that is, the formation of the cake, the washing, the drying, and the discharge of the cake.

The drum is continually rotated and as it rotates the filter surface is passed through the pulp. Each cell or compartment will, during submersion, be subjected to a vacuum and a cake begins to build and continues building to the point of emergence from the pulp while the liquid passes through the cake and the filtering medium and is removed by the pipes and the automatic valve.

The moment the liquid or solution disappears beneath the surface of the cake wash water may be applied, for instance, by the application of a spray. This effects a thorough wash of the cake without mixing of solutions.

As the drum continues to rotate and a given cell or compartment passes out of the washing zone, the vacuum is cut off, pressure in the form of air or steam is automatically turned on by a different port in the valve and the cake is consequently loosened and is removed by a scraper, hence forming a clean filter surface to pass forward to the point of immersion and the commencement of a new cycle.

In actual practice it has been found that the cake removed by pressure and scraper action often contains an excess of moisture. This is important whether the cake has been submitted to a washing action or not but especially when the cake is not submitted to a washing action as the solution remaining in the cake may contain a considerable portion of valuable material in solution.

Experience has shown that where the division strips forming the cells are placed horizontally or on a line parallel to the axis of the drum, perfect drainage is not obtained as a considerable amount of the solution is mechanically trapped or retained and that this solution is blown back into the cake when pressure is applied.

The object of the present invention is to overcome this defect by providing a cell or compartment structure which will not retain any of the solution or in other words which will permit substantially complete drainage and removal of the solution prior to the application of pressure.

The construction of the cells or compartments on the surface of the drum forms the subject matter of the present application and will be more fully described in the following description and illustrated in the accompanying drawings, in which—

Figure 1:
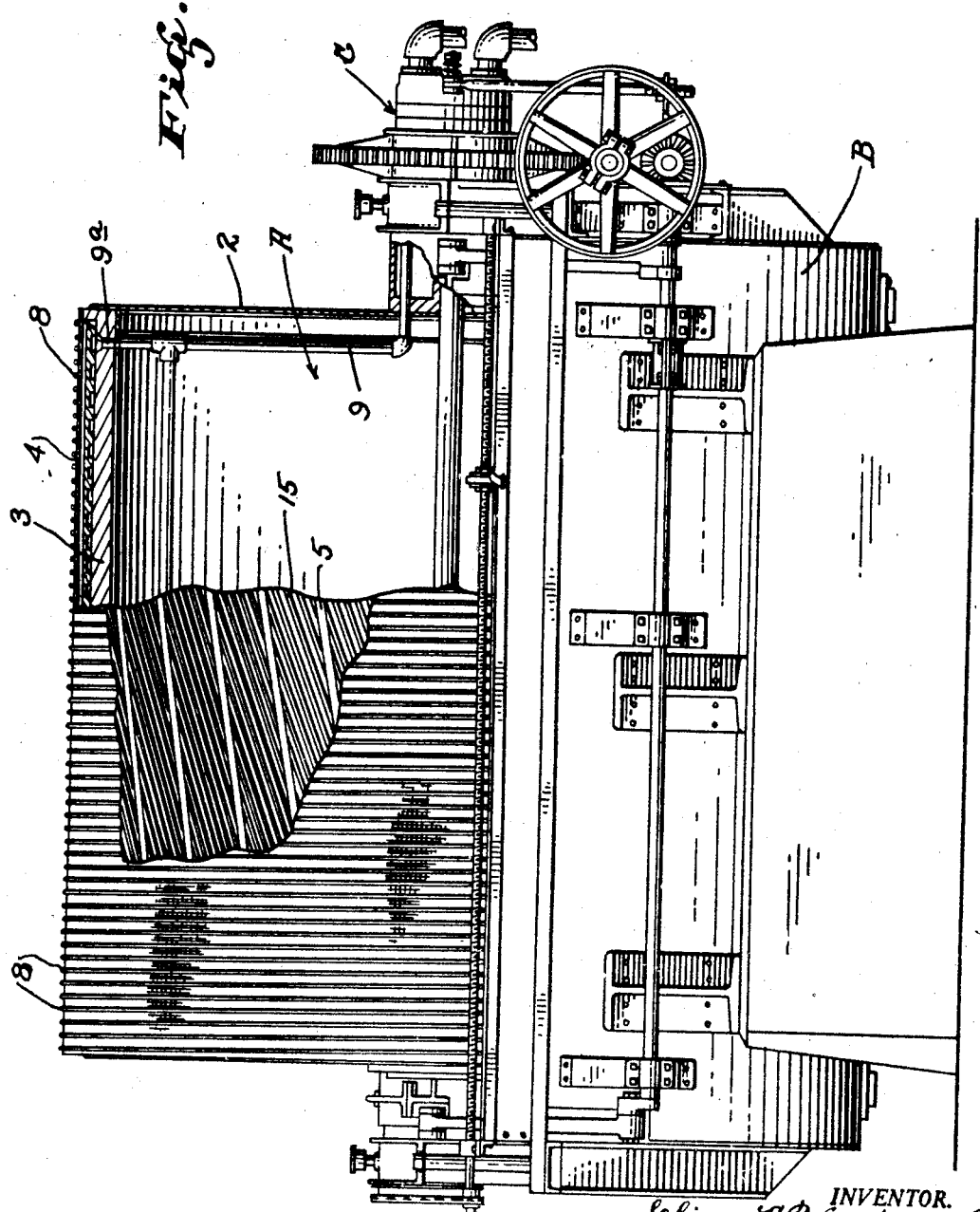
Fig. 1 is a side elevation of the filter, said elevation being partially broken away and being shown partially in section.
Figure 2:
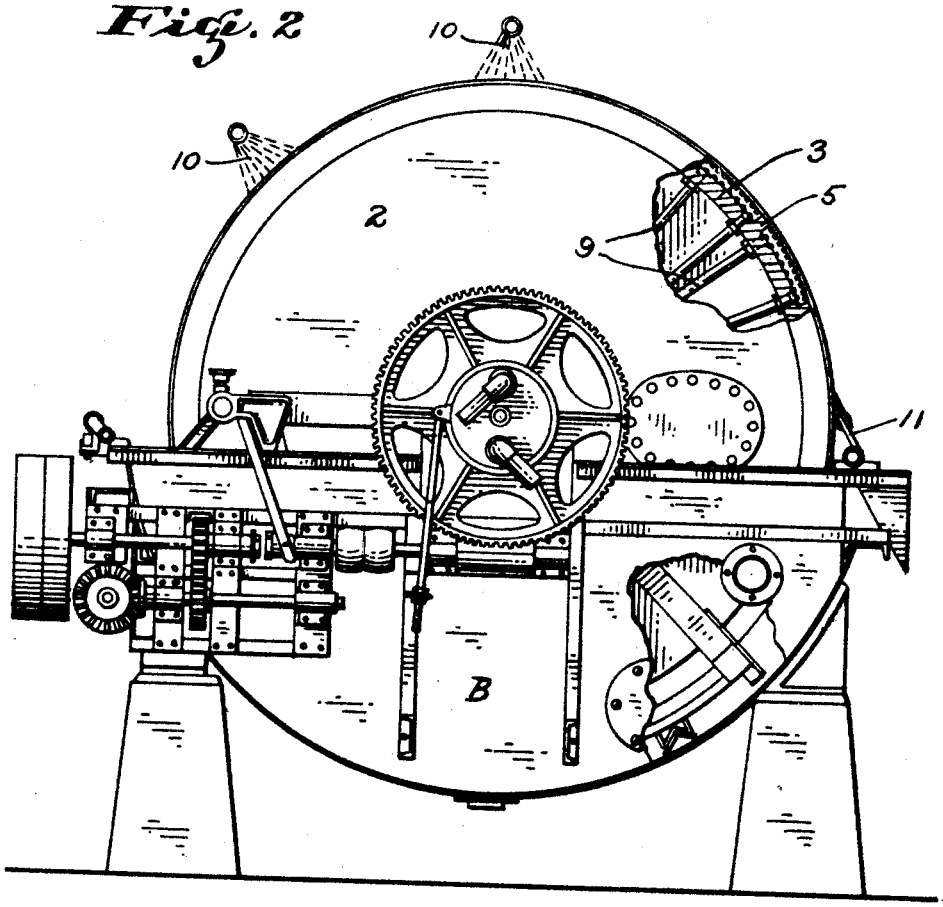
Fig. 2 is an end view of the filter.

Referring to the drawings in detail and particularly Figs. 1 and 2, A indicates in general a drum, the lower portion of which is submerged in a tank B containing the pulp or material to be filtered. The drum is provided with a pair of head or end members 2 and these support a hollow shell consisting of an inner air and water-tight backing, such as indicated at 3, and an outer surface 4 which is formed of a filtering medium hereinafter to be described.

A space is formed between the inner backing 3 and the filter medium 4 and this space is divided into a number of cells or filtering compartments by means of division strips generally indicated at 5. In common practice the division strips are placed horizontally or parallel to the axis 6 of the drum but in this instance, if reference will be made to Figs. 1 and 5, it will be noted that the division strips are disposed on a decided angle with relation to the axis of the drum. This is an important feature and will hereinafter be more fully described.

Figure 3:
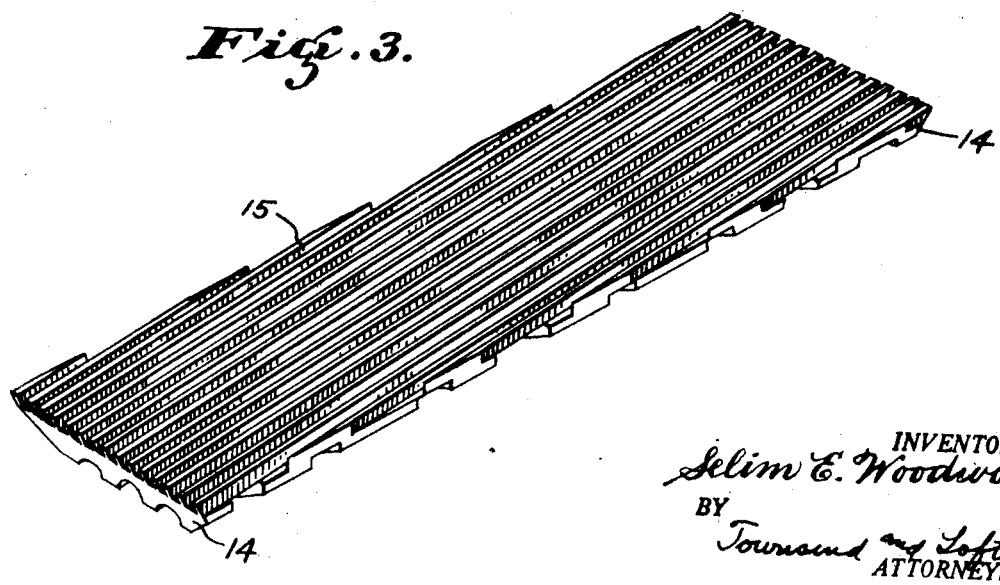
Fig. 3 is a perspective view of one of the filter medium supporting grids.
Figure 4:
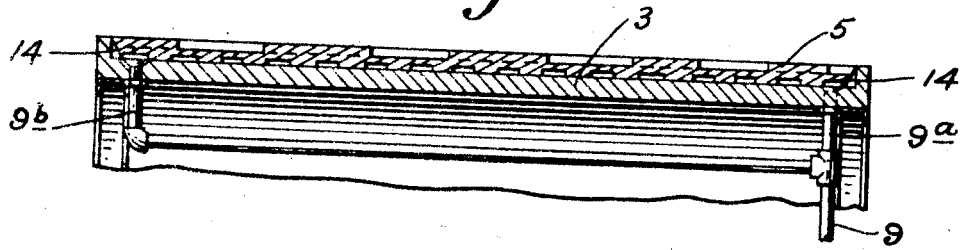
Fig. 4 is a longitudinal vertical section of one of the filter cells or compartments.

Disposed on each cell is a filter medium support, such as shown in Fig. 3. One or more of these supports are placed in each cell and they form the function of a support for the filtering medium and they also form the function of insuring more complete drainage of the solution passing through the cake and the filtering medium as will hereinafter be described. The filter medium employed will depend upon the nature of the pulp to be handled, being most commonly cotton or woolen cloth, such as illustrated at 4, or in some instances metal wire cloth especially woven. The filtering medium forms a continuous sheet around the surface of the drum and it is accordingly held in place against the division strips and the filter medium supports shown in Figs. 1 and 3 by helically wound wire 8 or any other suitable means.

Each compartment forms an independent filter unit even though the filtering medium is attached as a continuous sheet over the whole surface of the drum. This is due to the fact that the interior of the drum is provided with a system of radially disposed pipes which connect each compartment with an automatic valve generally indicated at C. One pipe is connected with each compartment as indicated at 9 and this pipe is branched to form two connections, one connection at 9a at one end of a filter compartment, and a second connection at 9b at the opposite end of a filter compartment. The valve C controls the application of vacuum and also the application of pressure and the pipes accordingly function both as drain pipes and as pressure pipes during the different cycles of operation.

The valve consists of a flat plate having a number of ports formed therein, the number of ports corresponding to the number of compartments on the surface of the filter drum. The valve also has annular ports formed therein corresponding to the different operations in the cycle of cake formation and as the drum rotates the ports are automatically covered and uncovered.

In actual operation the material to be filtered is fed into the tank B in a steady stream. A homogeneous mixture is obtained by agitation and as the drum rotates the filtering surface is passed through the agitated mass. Each compartment is subjected to vacuum when immersed and a cake begins to build and continues to build to the point of emergence from the pulp. The liquid in the pulp passes through the cake and the filtering medium and it also passes through the filtering medium support and is finally discharged through the pipes 9. When a filter compartment has passed out of the pulp and the liquid or solution disappears from the surface of the cake, wash water is applied in the form of a spray such as indicated by dotted lines at 10—10. This effects a thorough washing of the cake without mixing of solutions as the valve can be adjusted so that one or more washes may be applied and the filtrates kept separate.

As the drum continues to rotate and a given compartment passes out of the washing zone the vacuum is cut off by the automatic valve and compressed air is automatically turned on by a different port in the valve. This causes the cake to loosen and it is finally removed by a scraper such as shown at 11. This scraper may be disposed horizontally or on an angle substantially parallel to the division strips 5.

When the filter is used for dewatering only without washing of the cake, spray pipes are eliminated and a maximum vacuum is maintained to insure as complete a removal of moisture from the cake as possible. Under these conditions and with many materials, a cake may be dried to a point where it is discharged with as low as six to eight per cent moisture, but this is not often the case as the moisture content is as a rule much greater, the difference being due to the variable nature of the materials to be filtered. In addition to the actual moisture in the cake, experience has shown that there is a loss of additional moisture due to the fact that a certain amount of solution is trapped in each cell or filter compartment. This solution is blown out through the filter medium or back into the cake when pressure is applied and as such is permanently lost when the cake is removed. It is this loss which is objectionable and which has been to a large extent prevented in the present structure.

Figure 5:
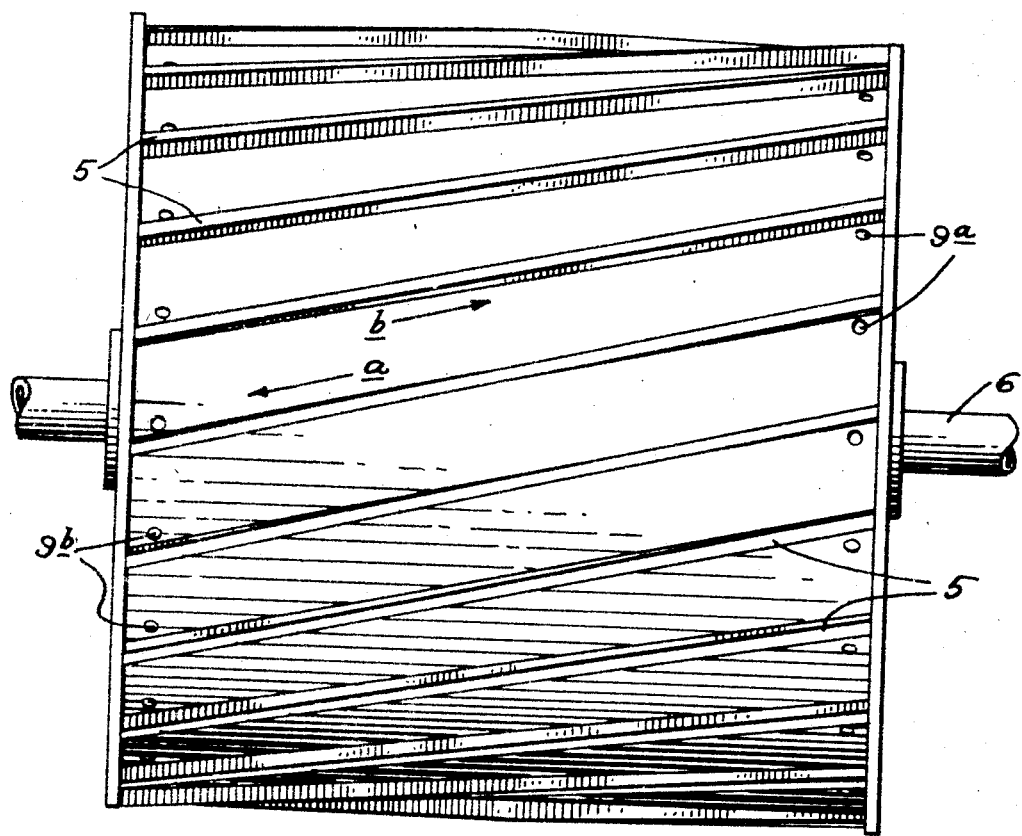
Fig. 5 is a side elevation of the filter drum showing the arrangement of the filtering cells or compartments formed on the exterior surface thereof.

The manner in which the solution is mechanically trapped will be understood from the following. It has already been stated that in most structures the division strips 5 are disposed parallel to the axis 6 of the drum. In such structures, the solution passes through the cake then through the filtering medium 4 and then through the filter medium support shown in Fig. 3. The solution is then deposited on the bottom surface of each cell compartment and it must flow outwardly along said bottom section until the drain pipes 9 can remove the same. If the division strips are horizontally disposed, it is obvious that a considerable amount of solution will collect in the angles formed between the side surfaces of the division strips and the filter medium support, hence preventing complete drainage of each compartment, but by placing the division strips on an angle such as shown in Fig. 5 the solution or liquid will obviously drain down the inclined surfaces formed by the same in the direction of arrows $a$, see Fig. 5, to the drain ports 9$b$, which connect with the pipes 9$b$. That is, drainage in the direction of arrow $a$ takes place on one side of the drum but as the drum rotates and passes above top center the strips 5 become inclined in the opposite direction and on that side of the drum, if any solution is left, it will drain down on the opposite side of the division strips in the direction of arrow $b$ and as such will escape through the drain pipes 9$a$. By referring to Figs. 1 and 3, it will be noted that the end sections of the filter medium support are cut away on an angle such as indicated at 14. Drain passages are thus formed at the opposite ends of the cells and any liquid which is collected in one corner will freely flow over to the opposite side and down to the next division strip as each cell or compartment passes over top center, hence by arranging the division strips 5 forming the cells or filter compartments on an angle as illustrated substantially complete drainage is obtained and loss of liquid or solution by mechanical trapping and blowing back into the cake is prevented.

The present invention is an improvement on my former patent entitled "Filter medium support", issued July 20th, 1926, Patent Number 1,593,051. In that instance better drainage than had formerly been obtained was secured by placing the slats 15 on the filter medium support shown in Fig. 3 on an angle with relation to the slats 5. In the present construction it is preferable to use a filter medium support such as shown in my former patent, hence it will be noted by referring to Fig. 1, that I first of all arranged the division strips 5 on an angle with relation to the longitudinal axis of the drum, and I secondly placed the slats in the grid or filter medium support on an angle to the division strips, this being clearly shown at 15 in Fig. 1. By this arrangement complete drainage is insured and the losses of solution are reduced to a minimum.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In a filter of the character described, a drum, a plurality of filter compartments formed on the exterior surface of the drum, said compartments being disposed on an angle with relation to the longitudinal axis of the drum, means connected with opposite ends of each compartment for drainage and for delivery of a fluid under pressure, and a filter medium forming a cover for each compartment.

2. In a filter of the character described, a drum, a plurality of filter compartments formed on the exterior surface of the drum, said compartments extending from end to end of the drum and their longitudinal axis being disposed on an angle with relation to the longitudinal axis of the drum, means connected with opposite ends of each compartment for drainage and for delivery of a fluid under pressure, and a filter medium covering each compartment.

3. In a filter of the character described, a drum, a plurality of filter compartments formed on the exterior surface of the drum, said compartments being disposed on an angle with relation to the longitudinal axis of the drum, means connected with opposite ends of each compartment for drainage and for delivery of a fluid under pressure, a filter medium forming a cover for each compartment, and a filter medium support in each compartment, said filter medium support comprising a plurality of interspaced strips parallel to each other but disposed on an angle with relation to the longitudinal axis of the filter compartments.

4. In a filter of the character described, a drum, a plurality of filter compartments formed on the exterior surface of the drum, said compartments being disposed on an angle with relation to the longitudinal axis of the drum, means connected with opposite ends of each compartment for drainage and for delivery of a fluid under pressure, a filter medium forming a cover for each compartment, a filter medium support in each compartment, said filter medium support comprising a plurality of interspaced strips parallel to each other but disposed on an angle with relation to the longitudinal axis of the filter compartments, and said strips being cut on an angle and at opposite ends to form a drain passage at each end of each filter compartment.

5. In a filter of the character described, a drum, a plurality of spacing strips secured to the exterior surface of the drum and forming a plurality of filtering compartments, said strips being disposed on an angle with relation to the longitudinal axis of the drum, means connected with opposite ends of each compartment for drainage and for delivery of a fluid under pressure, and a filter medium covering the filtering compartments.

6. In a filter of the character described, a drum, a plurality of spacing strips secured to the exterior surface of the drum and forming a plurality of filtering compartments, said strips being disposed on an angle with relation to the longitudinal axis of the drum, means connected with opposite ends of each compartment for drainage and for delivery of a fluid under pressure, a filter medium covering the filtering compartments, and a support in each compartment for the filtering medium.

7. In a filter of the character described, a drum, a plurality of spacing strips secured to the exterior surface of the drum and forming a plurality of filtering compartments, said strips being disposed on an angle with relation to the longitudinal axis of the drum, pipes connected with the opposite ends of each compartment for drainage and for delivery of a fluid under pressure, and a filtering medium covering the compartments.

SELIM E. WOODWORTH.